Patented Jan. 4, 1944

2,338,427

UNITED STATES PATENT OFFICE 2,338,427

REGENERATING OF VULCANIZED RUBBER

Walter Gumlich, Leverkusen-Schlebusch, and Ruprecht Ecker, Cologne-Rath, Germany; vested in the Alien Property Custodian No Drawing. Application April 3, 1940, Serial No. 327,634. In Germany April 1, 1939

5 Claims. (Cl. 260—720)

The present invention relates to improvements in the reclaiming of rubber vulcanizates and comprises a new method of renewing the plastic properties of vulcanized scrap.

Up to the present natural rubber has usually been reclaimed by heating the vulcanizates with a highly concentrated caustic soda solution or with a solution of a mineral acid. The use of high temperatures and of softeners is often resorted to in order to produce a uniform and plastic reclaim, such processes being usually accompanied by material decreases in tensile strength. These processes generally require the application of high temperatures of about 180° C., the heating being continued for a prolonged time, say about 5–15 hours. Whereas processes of the character described are practically used for the reclaiming of natural rubber, there is still a lack of suitable reclaiming processes for synthetic rubber-like materials which are obtained by the polymerization of butadiene hydrocarbons or by the copolymerization of such butadienes with other polymerizable substances. The problem of reclaiming such synthetic rubber-like materials is the more grave as the vulcanizates are often built up from a mixture of natural and synthetic rubber and as the presence therein of a preponderant amount of synthetic rubber prevents the products from being reclaimable.

It is the object of the present invention to develop a new process which allows one to effect the reclaiming of rubber vulcanizates consisting of or containing a preponderant amount of butadiene synthetic rubber-like materials prepared by the polymerization of butadiene or by the co-polymerization of butadienes with other polymerizable substances. It is a further object of this invention to effect the re-claiming of such rubber vulcanizates at a lower temperature and more quickly than it was possible in accordance with the hitherto known methods. Other objects will be apparent from the following description and claims.

It has been found that rubber vulcanizates consisting of or containing a preponderant amount of butadiene synthetic rubber-like materials prepared by the polymerization of butadienes or by the co-polymerization of butadienes with other polymerizable substances can be re-claimed by incorporating therewith an aromatic mercaptane, i. e. a compound of the formula $R.SH$ wherein $R$ stands for an aromatic radical, and heating the mixture to a high temperature of for instance about 130 to about 150° C. In accordance with a preferred method of working the heating is effected in an atmosphere containing oxygen at a higher pressure and concentration per $cm.^3$ than it is normally found in the atmosphere. The oxygen may be applied in any desired manner for instance in the form of air or of agents yielding oxygen under the conditions of working. In general, the vulcanizates are treated with the aromatic mercaptanes in the presence of air and steam under pressure. In practice the ground vulcanizates are mixed with the aromatic mercaptane and placed in an autoclave, air being pressed into the same so as to reach a pressure of several atmospheres (say about 2–6), the necessary temperature being generated by causing compressed steam to enter the autoclave so that an increase of pressure of several further atmospheres is effected. The aromatic mercaptanes can be incorporated within the vulcanizates either per se or with the aid of the usual rubber softeners such as "caoutchol."

Examples for suitable reclaiming agents are thiophenols, thiocresols, thionapthols, thioxylols and thioanthracenes. In general, these reclaiming agents are employed in an amount of about 1 to about 5% of the vulcanizate. Additional softeners, if any, are likewise employed in an amount of about 5% of the vulcanizate.

The present invention allows one to convert vulcanized natural rubber into a plastic and vulcanizable condition in a much shorter time and at a considerably lower temperature than it was possible in accordance with the hitherto known methods. As an example, vulcanized natural rubber can be reclaimed by means of the auxiliary agents of the present invention 4 times as quickly than it would be reclaimed under the same conditions in the absence of aromatic mercaptanes. Synthetic rubber-like materials of the character described can easily be reclaimed in accordance with the present invention, the resulting products showing an excellent plasticity and, if vulcanized, very often better mechanical properties than vulcanisates of regenerated natural rubber or the original vulcanisates of the synthetic rubber. Therefore, the present invention also allows one to reclaim a vulcanizate which has been built up from a mixture of synthetic rubber and natural rubber even if the former is present therein in a preponderant amount.

Examples for synthetic rubber-like materials which have been employed for the present reclaiming process are the products of the sodium polymerization of butadiene-1.3, furthermore, the products of the emulsion polymerization of butadiene-1.3-hydrocarbons either alone or in admixture with other polymerizable substances such as styrene, acrylic acid nitrile and unsaturated ketones such as vinyl methyl ketone. Furthermore, there may be mentioned the products of the polymerization of chloro-2-butadiene-1.3. As a matter of fact, the present process can be applied to unused rubber scrap as well as to materials which have undergone a long continued usage.

The present invention is illustrated by the following examples without being restricted thereto, the parts being by weight:

Example 1

100 parts of a ground vulcanizate of a synthetic rubber-like material which has been prepared by the emulsion polymerization of 75 parts of butadiene and 25 parts of styrene is mixed with 3 parts of β-thionaphthol. An excellently plastic and vulcanizable product is obtained after a 1½ hours heating to about 130°. The reclaiming process can be performed within about 1 hour in case an overpressure of 3 atmospheres of air and 3 further atmospheres of steam is applied.

Similar results can be obtained by replacing the β-thionaphthol by an equal amount of thioanthracenes or of thiocresols.

Example 2

A ground vulcanizate of a synthetic rubber, which has been prepared by the emulsion polymerization of butadiene and vinyl methyl ketone in the proportion of 1:1, requires a 1 hours heating to 130° in the presence of 3% of m-methoxy-thiophenol for being converted into a plastic and vulcanizable product. Also in this case the reclaiming can be accelerated by effecting the process in the presence of compressed air and compressed steam.

Example 3

3 parts of β-thionaphthol are incorporated within 100 parts of a product of the conjoint emulsion polymerization of butadiene and acrylic acid nitrile in the proportion of 3:1, 5% of "caoutchol" being employed for securing a better interpenetration of the rubber and the thionaphthol. The mixture is heated for about 1½ hours to 130° C. at an overpressure of air of about 2 atmospheres in the presence of 4 further atmospheres of compressed steam. The resulting product shows a good plasticity and exhibits excellent mechanical properties if vulcanized again.

We claim:

1. The reclaiming of rubber vulcanizates containing a preponderant amount of butadiene synthetic rubber-like materials obtained by polymerizing a member of the group consisting of butadiene and mixtures of butadiene with other polymerizable compounds capable of forming rubber-like copolymers therewith by heating the same in the presence of an aromatic mercaptane at a temperature between about 130–150° C. in an atmosphere containing oxygen at a higher pressure and concentration per cm.$^3$ than it is normally found in the atmosphere.

2. The reclaiming of rubber vulcanizates containing a preponderant amount of butadiene synthetic rubber-like materials obtained by polymerizing a member of the group consisting of butadiene and mixtures of butadiene with other polymerizable compounds capable of forming rubber-like copolymers therewith by heating the same in the presence of an aromatic mercaptane at a temperature between about 130–150° C. with compressed steam in an atmosphere containing oxygen at a higher pressure and concentration per cm.$^3$ than it is normally found in the atmosphere.

3. The process as claimed in claim 1 wherein thionaphthol is employed as the aromatic mercaptane.

4. Process as claimed in claim 2 wherein thionaphthol is employed as the aromatic mercaptane.

5. The process as in claim 1 in which the aromatic mercaptane employed is m-methoxy-thiophenol.

WALTER GUMLICH.
RUPRECHT ECKER.